United States Patent
Kawai

(10) Patent No.: US 11,379,999 B2
(45) Date of Patent: Jul. 5, 2022

(54) FEATURE EXTRACTION METHOD, COMPARISON SYSTEM, AND STORAGE MEDIUM

(71) Applicant: NEC CORPORATION, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/966,984

(22) PCT Filed: Feb. 18, 2019

(86) PCT No.: PCT/JP2019/005798
§ 371 (c)(1),
(2) Date: Aug. 3, 2020

(87) PCT Pub. No.: WO2019/163699
PCT Pub. Date: Aug. 29, 2019

(65) Prior Publication Data
US 2021/0049777 A1    Feb. 18, 2021

(30) Foreign Application Priority Data
Feb. 20, 2018    (JP) .............................. JP2018-027512

(51) Int. Cl.
*G06K 9/00*        (2022.01)
*G06T 7/254*       (2017.01)
(Continued)

(52) U.S. Cl.
CPC ............... *G06T 7/254* (2017.01); *G06T 7/73* (2017.01); *G06V 10/28* (2022.01); *G06V 10/40* (2022.01); *G06T 2207/10004* (2013.01)

(58) Field of Classification Search
CPC ....................... G06T 7/254; G06T 7/73; G06T 2207/10004; G06K 9/38; G06K 9/46;
(Continued)

(56) References Cited

U.S. PATENT DOCUMENTS

| 2009/0080711 A1* | 3/2009 | Yokoi ..................... | G06K 9/629 382/116 |
| 2010/0061637 A1* | 3/2010 | Mochizuki ............... | G06K 9/48 382/199 |
| 2011/0243383 A1* | 10/2011 | Oyaizu .................... | G06T 7/248 382/103 |

FOREIGN PATENT DOCUMENTS

| JP | 2008-129864 A | 6/2008 |
| JP | 2010-281637 A | 12/2010 |

(Continued)

OTHER PUBLICATIONS

Written Opinion for PCT/JP2019/005798, dated May 7, 2019.
(Continued)

*Primary Examiner* — Sean M Conner
*Assistant Examiner* — Han Hoang

(57) ABSTRACT

The feature extraction device according to one aspect of the present disclosure comprises: a reliability determination unit that determines a degree of reliability with respect to a second region, which is a region that has been extracted as a foreground region of an image and is within a first region that has been extracted from the image as a partial region containing a recognition subject, said degree of reliability indicating the likelihood of being the recognition subject; a feature determination unit that, on the basis of the degree of reliability, uses a first feature which is a feature extracted from the first region and a second feature which is a feature extracted from the second region to determine a feature of the recognition subject; and an output unit that outputs information indicating the determined feature of the recognition subject.

20 Claims, 10 Drawing Sheets

(51) Int. Cl.
  *G06T 7/73* (2017.01)
  *G06V 10/28* (2022.01)
  *G06V 10/40* (2022.01)

(58) Field of Classification Search
  CPC ........... G06K 9/626; G06K 2009/6213; G06K 9/6212; G06K 9/4642; G06K 9/3233; G08B 13/19602
  See application file for complete search history.

(56) References Cited

FOREIGN PATENT DOCUMENTS

| | | |
|---|---|---|
| JP | 2011-095921 A | 5/2011 |
| JP | 2011-211628 A | 10/2011 |
| JP | 2014-048970 A | 3/2014 |
| JP | 2016-071502 A | 5/2016 |
| JP | 2016-081271 A | 5/2016 |
| JP | 5914046 B2 | 5/2016 |
| JP | 5959093 B2 | 8/2016 |

OTHER PUBLICATIONS

International Search Report for PCT/JP2019/005798, dated May 7, 2019.
Japanese Office Action for JP Application No. 2020-501744 dated Jun. 8, 2021 with English Translation.

\* cited by examiner

US 11,379,999 B2

FEATURE EXTRACTION METHOD, COMPARISON SYSTEM, AND STORAGE MEDIUM

CROSS REFERENCE TO RELATED APPLICATIONS

This application is a National Stage of International Application No. PCT/JP2019/005798 filed Feb. 18, 2019, claiming priority based on Japanese Patent Application No. 2018-027512 filed Feb. 20, 2018, the disclosure of which is incorporated herein in its entirety by reference.

TECHNICAL FIELD

The present disclosure relates to a technique of extracting a feature from a foreground region included in an image.

BACKGROUND ART

A technique of detecting a suspicious object, discriminating a person, and the like by processing an image acquired from a monitoring camera and the like by a computer has been actively developed. Generally, such a technique includes, prior to extracting a feature of an object or a person, processing of extracting a region (hereinafter, a "foreground region") relevant to a foreground within an image by a background subtraction method and the like.

Accuracy of processing of extracting a foreground region is likely to depend on an environment and the like in which a subject is captured, such as a state of illumination. In view of the above, various techniques for accurately extracting a foreground region have been proposed. For example, PTLs 1 to 4 are documents describing methods of more accurately extracting a foreground region.

A person search system described in PTL 1 performs clustering for separating a person and a background in order to compensate deficiency of a region of the person, which may occur when background subtraction for extracting the person is performed.

An image processing device described in PTL 2 extracts a foreground region with high accuracy by eliminating, from a region which is supposed to be the foreground region, a region of shadow of a target object.

An image processing device described in PTL 3 determines whether a background-subtracted image is collapsed, specify a type of collapse, and update a reference background image according to the type of collapse.

An image processing device described in PTL 4 performs extraction of a subject region more accurately by using distance information from a viewpoint with respect to each pixel of an image.

CITATION LIST

Patent Literature

[PTL 1] Japanese Patent No. 5959093
[PTL 2] Japanese Unexamined Patent Application Publication No. 2008-129864
[PTL 3] Japanese Unexamined Patent Application Publication No. 2011-211628
[PTL 4] Japanese Patent No. 5914046

SUMMARY OF INVENTION

Technical Problem

Even when the techniques described in PTLs 1 to 4 are employed, a foreground region may not be correctly extracted.

When a technique of extracting a foreground region and extracting a feature is actually applied to a monitoring system in which recognition of a target captured in an image, or the like is performed, not only accuracy but also speed is required. In view of the above, it is desirable to reduce an amount of calculation and time required for processing of extracting a foreground region as much as possible. When a method of extracting a foreground region with a small amount of calculation is applied to a monitoring system, based on such a demand, the foreground region may not be always correctly extracted.

In view of the above, a method of suppressing inaccurate derivation of a feature, when a foreground region is not correctly extracted, needs to be proposed.

An object of the present invention is to provide a feature extraction device that is able to suppress inaccurate derivation of a feature, even when a foreground region is not correctly extracted.

Solution to Problem

A feature extraction device according to one aspect of the present invention includes: a reliability degree determination unit for determining a degree of reliability indicating a likelihood of being a recognition target, with respect to a second region being a region extracted as a foreground region of an image, the second region being a region within a first region, the first region being a region extracted from the image as a partial region including the recognition target; a feature determination unit for determining a feature of the recognition target, based on the degree of reliability, by using a first feature being a feature extracted from the first region and a second feature being a feature extracted from the second region; and an output unit for outputting information indicating the feature of the recognition target determined.

A feature extraction method according to one aspect of the present invention includes: determining a degree of reliability indicating a likelihood of being a recognition target, with respect to a second region being a region extracted as a foreground region of an image, the second region being a region within a first region extracted from the image as a partial region including the recognition target; determining a feature of the recognition target, based on the degree of reliability, by using a first feature being a feature extracted from the first region, and a second feature being a feature extracted from the second region; and outputting information indicating the feature of the recognition target determined.

A program according to one aspect of the present invention causes a computer to execute: reliability degree determination processing of determining a degree of reliability indicating a likelihood of being a recognition target, with respect to a second region being a region extracted as a foreground region of an image, the second region being a region within a first region extracted from the image as a partial region including the recognition target; feature determination processing of determining a feature of the recognition target, based on the degree of reliability, by using a first feature being a feature extracted from the first region, and a second feature being a feature extracted from the second region; and output processing of outputting information indicating the feature of the recognition target determined. The program is storable in a computer-readable non-transitory storage medium.

Advantageous Effects of Invention

The present invention is able to suppress inaccurate derivation of a feature, even when a foreground region is not correctly extracted.

EXAMPLE EMBODIMENT

In the following, example embodiments according to the present invention are described in detail with reference to the drawings.

First Example Embodiment

Figure 1:
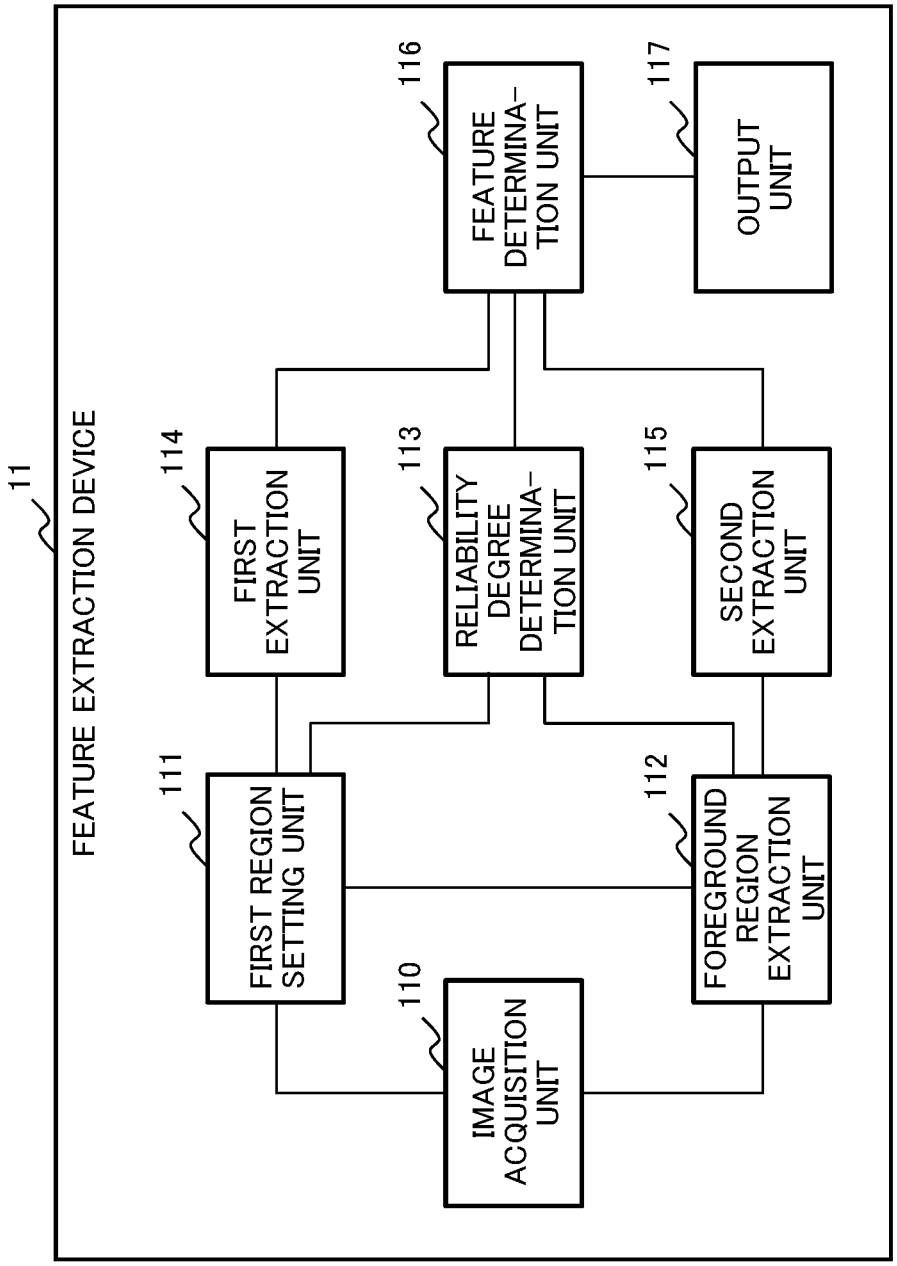
FIG. 1 is a block diagram illustrating a configuration of a feature extraction device according to a first example embodiment of the present invention.

First, a first example embodiment according to the present invention is described.
<Configuration>
FIG. 1 is a block diagram illustrating a configuration of a feature extraction device 11 according to the first example embodiment.

The feature extraction device 11 includes an image acquisition unit 110, a first region setting unit 111, a foreground region extraction unit 112, a reliability degree determination unit 113, a first extraction unit 114, a second extraction unit 115, a feature determination unit 116, and an output unit 117.

In the following, a function of each constituent element within the feature extraction device 11 is described. As will be described later, each constituent element within the feature extraction device 11 may be achieved by a computer including one or a plurality of processors and a memory that execute an instruction, based on a program.

When data are generated or acquired, each constituent element within the feature extraction device 11 may make the data available to another constituent element. For example, each constituent element may transmit generated or acquired data to another constituent element that uses the data. Alternatively, each constituent element may record generated or acquired data in a storage area (such as a memory, which is not illustrated) within the feature extraction device 11. When executing each processing, each constituent element of the feature extraction device 11 may directly receive data to be used from a constituent element that has generated or acquired the data, or may read the data from the storage area.

A Line connecting constituent elements, which is illustrated in FIG. 1, is an exemplary line for easy understanding of a flow of data. It is not necessarily required that the constituent elements are connected by a signal line similar to the line illustrated in FIG. 1.

===Image Acquisition Unit 110===

The image acquisition unit 110 acquires an image for use in processing by the feature extraction device 11. The image acquisition unit 110 acquires, for example, an image captured by an image capturing device such as a camera from the image capturing device, a storage medium storing the image, or the like. The image acquired by the image acquisition unit 110 is typically a plurality of images acquired by capturing a same place at a certain interval. The image acquisition unit 110 may acquire moving image data. The image acquisition unit 110 may acquire a plurality of frames constituting the moving image data, as an image for use in the processing by the feature extraction device 11.

===First Region Setting Unit 111===

The first region setting unit 111 sets a "first region" from at least one (hereinafter, also referred to as a "target image") of images acquired by the image acquisition unit 110. In the present disclosure, the "first region" of an image is a region in the image, and set in such a way to include a recognition target captured in the image.

In the following description, a person is presumed as a recognition target. However, the recognition target may be a moving body (e.g., a living thing other than a human, a vehicle, a ship, a flying object, and the like) other than a person. The recognition target may be a part (an upper body, a face, and the like) of a moving body.

The first region setting unit 111 may specify a partial region including a person captured in a target image, and set the specified partial region as the first region. A method for specifying a partial region including a person may be an existing method known as a person detection method.

Specifically, for example, the first region setting unit 111 may search a partial region in a target image that includes a person by using a discriminator for discriminating whether a person is included in an image by using a feature acquired from the image of a certain area, and thereby specify the partial region. As a specific example of a discrimination method by the above-described discriminator, a method using a luminance gradient direction histogram and a classifier, and the like are exemplified.

Figure 2:
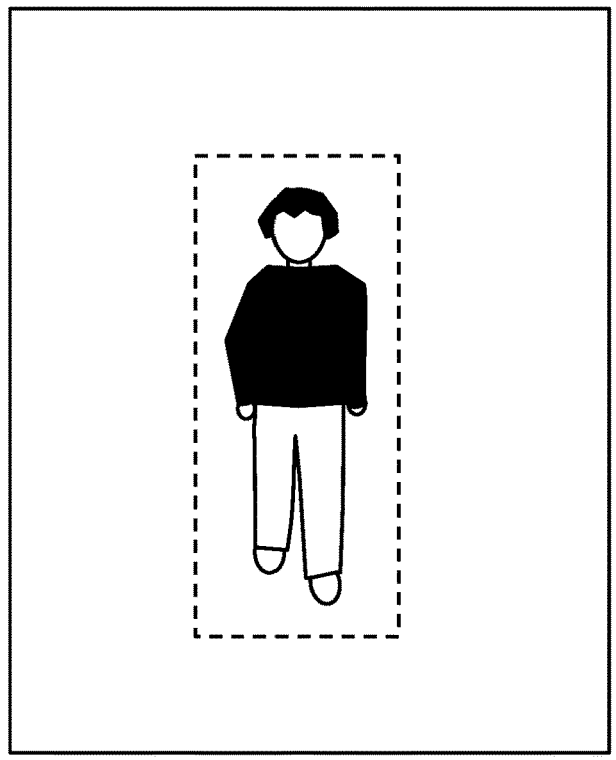
FIG. 2 is a diagram illustrating an example of a partial region being a basis of a first region.
Figure 3:
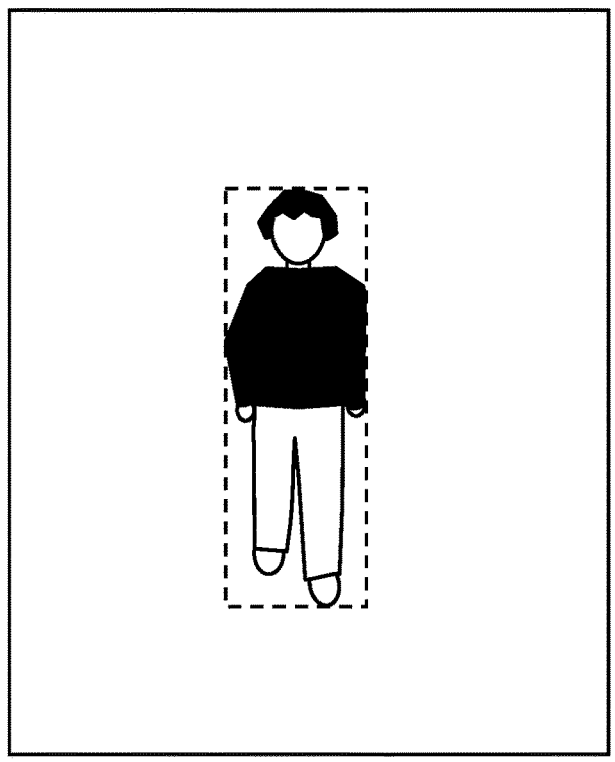
FIG. 3 is a diagram illustrating an example of the first region.

FIGS. 2 and 3 are diagrams illustrating an example of a partial region being specified as a partial region including a person. An area of the specified partial region can be a rectangular area surrounding a person, as exemplified by an area indicated by a broken line in FIG. 2 or FIG. 3. The partial region illustrated in FIG. 3 is a rectangle whose four sides circumscribe a person. In order to specify a rectangle whose four sides circumscribe a person, for example, the first region setting unit 111 may specify a region of the person, and derive an upper end, a lower end, a left end, and a right end of the specified region.

A size and a shape of the specified partial region may not be uniform. For example, when searching the partial region including a person, the first region setting unit 111 may change a size and a shape of the partial region for use in search, according to a position within a screen.

The shape of the specified partial region is not limited to a rectangle. The shape of the specified partial region may be a quadrangle other than an oblong rectangle (such as a trapezoid and a rhombus), a polygonal shape other than a quadrangle, a circle, an oval, or another closed curve.

The specified partial region and the first region may not be the same. The first region setting unit 111 may set a region acquired by modifying the specified partial region, as the first region. For example, the first region setting unit 111 may set, as the first region, a region acquired by eliminating, from the specified partial region, a part that does not include a person.

The first region setting unit 111 may specify a partial region including a person captured in a target image by detecting a part of the person. For example, the first region setting unit 111 may detect a portion relevant to a part of a person, such as a body part including a face, a hand, and the like, a wearing article including a hat and shoes, or the like, and estimate a partial region including the person, based on a position where the portion is detected.

Also when a recognition target is not a person, the first region setting unit 111 may specify a region including the recognition target by a detection method according to a type of the recognition target.

===Foreground Region Extraction Unit 112===

The foreground region extraction unit 112 extracts a foreground region from a target image for which the first region setting unit 111 has set (or will set) a first region. The foreground region is a region that is estimated to be a foreground. In other words, the foreground region is a region which is not present in a background image, and which is presumed to be a region of a recognition target.

The foreground region extraction unit 112 extracts a foreground image, for example, by performing background subtraction with use of a target image, and an image (in other words, a background image), which is acquired by image capturing prior to image capturing of the target image, and which does not include a recognition target. The background subtraction method may be an existing method. As an example of the background subtraction method, a background subtraction method based on a background model constructed by using a mixed Gaussian distribution is exemplified.

In the present example embodiment, a foreground region within a first region among a foreground region extracted by the foreground region extraction unit 112 is used. Therefore, the foreground region extraction unit 112 may be configured in such a way as to extract the foreground region from an area of the first region. In the following description, a term "foreground region" indicates a foreground region within a first region, unless otherwise specifically mentioned.

===Reliability Degree Determination Unit 113===

The reliability degree determination unit 113 determines a degree of reliability of a foreground region, based on a first region extracted by the first region setting unit 111, and the foreground region extracted by the foreground region extraction unit 112.

The degree of reliability of the foreground region is an index indicating a degree to which a feature to be extracted from the foreground region is expected to be a feature of a recognition target. In other words, the higher the degree of reliability is, the more accurately a feature of a recognition target is expected to be acquired, when a feature is extracted from a foreground region. The reliability degree determination unit 113 determines a degree of reliability by a determination method in which a degree of reliability increases as similarity of an extracted foreground region to a true region of a recognition target increases. The degree of reliability indicates, in a way, a likelihood that a foreground region is a recognition target. The degree of reliability can also be said to indicate a likelihood that a foreground region is a region occupied by a recognition target.

The degree of reliability is, for example, expressed by a numerical value. In the following description, it is interpreted that the larger a value indicating a degree of reliability is, the higher the degree of reliability is, while it may also be defined that the smaller a value indicating a degree of reliability is, the higher the degree of reliability is.

An example of a method for determining a degree of reliability by the reliability degree determination unit 113 is described. It is assumed that an area of a first region set by the first region setting unit 111 is a "first area". It is assumed that an area of a foreground region calculated by the foreground region extraction unit 112 is a "foreground area". The reliability degree determination unit 113 may determine a degree of reliability, based on a ratio (hereinafter, referred to as a "foreground ratio") of the foreground area to the first area.

Figure 4:
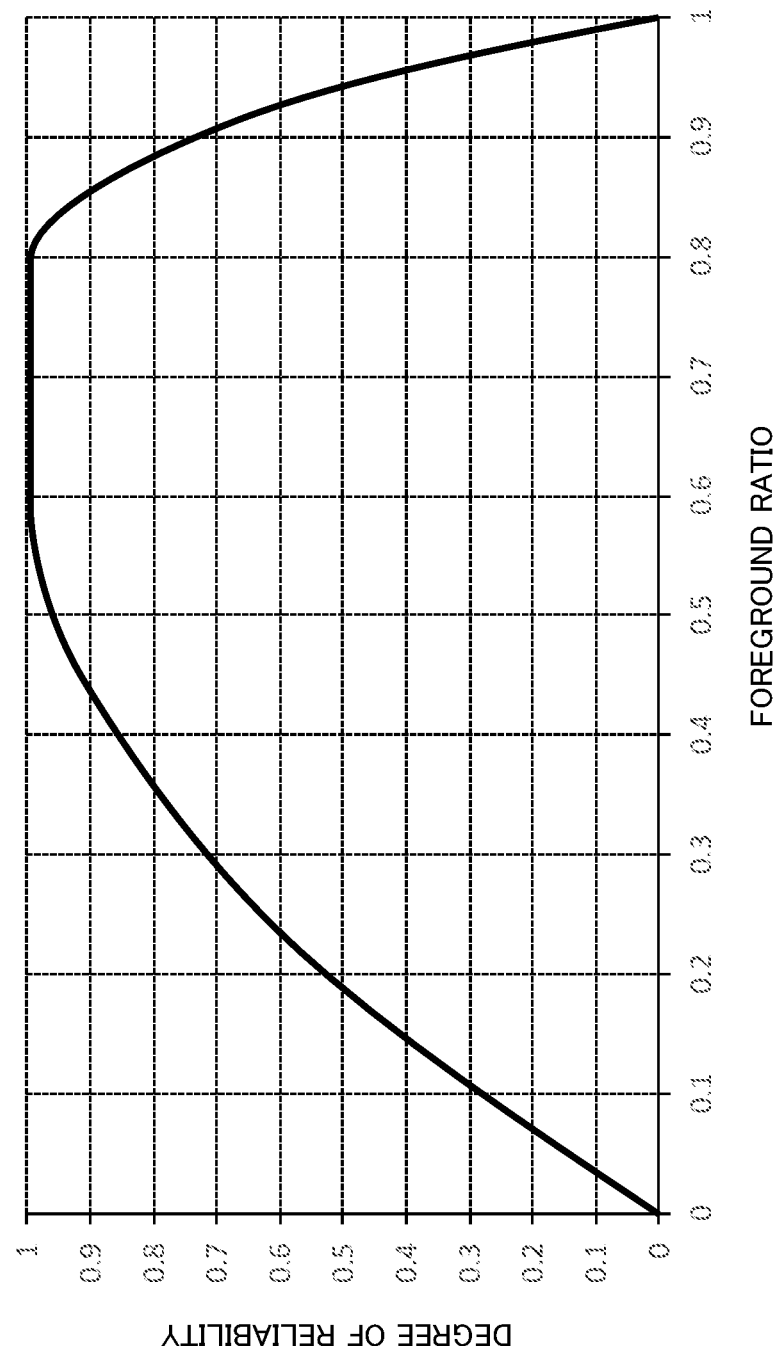
FIG. 4 is a diagram for describing one example of a reliability degree calculation method.

For example, when the first region is a rectangular region illustrated in FIG. 3, a ratio of an area occupied by a walking person to an area of the first region is expected to be about 0.7. Therefore, for example, the reliability degree determination unit 113 may determine a degree of reliability according to a foreground ratio by a determination method in which a degree of reliability is determined to be highest when the foreground ratio is about 0.7. For example, the reliability degree determination unit 113 may determine a degree of reliability by a determination method, as illustrated in FIG. 4, defined in such a way that a value indicating a degree of reliability becomes a maximum value when the foreground ratio is around 0.7.

A matter that the foreground ratio is 1 means that the entirety of the first region is extracted as a foreground region. Since it is less likely that a recognition target completely matches the shape of a first region, when the foreground ratio is close to 1 (e.g., larger than a first value α), it is recommended that a value indicating a degree of reliability is determined to be a value that is not a maximum value. More specifically, a reliability degree determination method may be designed in such a way that, when the foreground ratio is close to 1, a degree of reliability is determined to be lower, as the foreground ratio becomes larger than the first value α.

When the foreground ratio is close to 0 (e.g., smaller than a second value β (≤α)), since a foreground region is hardly extracted within a first region, it is recommended that a value indicating a degree of reliability is determined to be a value that is not a maximum value. More specifically, when the foreground ratio is close to 0, a reliability degree determination method may be designed in such a way that a degree of reliability is determined to be lower as the foreground ratio becomes smaller than the second value β.

The reliability degree determination unit 113 may determine, as a value indicating a degree of reliability, a value prepared according to a range of the foreground ratio. For example, the reliability degree determination unit 113 may determine a value indicating a degree of reliability to be "1" when the foreground ratio x satisfies 0.5<x<0.9, and otherwise, determine a value indicating a degree of reliability to be "0".

A value indicating a degree of reliability may be determined by a function in which a foreground ratio is set as a variable. As an example of the function, $f(x)=4x^2(1-x^2)$ is exemplified. Note that, x is a foreground ratio. The function takes a maximum value of 1 when the foreground ratio is $1/\sqrt{2}$.

A reliability degree determination method and numerical values described above are examples. A relationship between a foreground ratio and a degree of reliability can be different depending on a method for setting a first region. For example, regarding a foreground ratio based on the first region exemplified by the broken line in FIG. 2, and a foreground ratio based on the first region exemplified by the broken line in FIG. 3, a value of the foreground ratio having a highest degree of reliability is supposed to be smaller in the former case.

Various methods are proposed in addition to the above, as a reliability degree determination method. Another example of the reliability degree determination method will be described in detail in a below-described modification example.

===First Extraction Unit 114===

The first extraction unit 114 extracts a feature from a first region of a target image. A method for extracting a feature may be a well-known method. As an example of the feature being extracted, a color feature, a frequency feature, and the like are exemplified. The feature is, for example, expressed in the format of a vector. The format of data representing the feature may be a format usable for discrimination. Hereinafter, the feature extracted by the first extraction unit 114 is described as a "first region feature". The first extraction unit 114 extracts the first region feature by using information on all pixels of the first region.

===Second Extraction Unit 115===

The second extraction unit 115 extracts a feature from a foreground region of a target image. The feature extracted is a feature of a same type as the first region feature. Hereinafter, the feature extracted by the second extraction unit 115 is described as a "foreground region feature".

The second extraction unit 115 may extract the foreground region feature by an algorithm of a same type as an extraction algorithm used by the first extraction unit 114. The first extraction unit 114 and the second extraction unit 115 are configured in such a way that the number of components of the foreground region feature and the number of components of the first region feature become equal to each other.

===Feature Determination Unit 116===

The feature determination unit 116 determines a feature of a recognition target, based on a degree of reliability determined by the reliability degree determination unit 113, and by using at least one of a first region feature extracted by the first extraction unit 114 and a foreground region feature extracted by the second extraction unit 115.

The feature of the recognition target is information expressed in a format similar to the formats of the first region feature and the foreground region feature. The feature of the recognition target is, for example, used in discrimination of the recognition target (specifically, identification of an individual, and the like).

An example of a method for determining a feature of a recognition target is described. The feature determination unit 116, for example, performs, with respect to a foreground region feature and a first region feature, an addition accompanying weighting based on a degree of reliability, and determines a result of the addition, as a feature of a recognition target. Specifically, the feature determination unit 116 may derive a feature F of a recognition target, based on the following formula.

$$F = c \times f_2 + (1-c) \times f_1$$

Note that, $f_1$ denotes a first region feature, $f_2$ denotes a foreground region feature, and c denotes a scalar value indicating a degree of reliability.

However, in the above-described formula, a corrected value of $f_1$, $f_2$, or c may be used, in place of $f_1$, $f_2$, or c. For example, when a value indicating the first region feature, and a scale (scale of an available range) of a value indicating the foreground region feature are different, $f_1$ and $f_2$ may be corrected in such a way that scales of $f_1$ and $f_2$ coincide with each other. For example, when the feature is a histogram indicating a color frequency distribution, the larger a target region from which the feature is extracted is, the higher the scale of the value is. Therefore, the feature determination unit 116 may perform correction in which $f_2$ is divided by a ratio of an area of a foreground region feature value to an area of the first region feature, and a value $f_2'$ after the correction may be used in place of $f_2$. In addition to the above-described correction, any correction or pre-processing may be performed regarding $f_1$, $f_2$, and c, as far as the correction or the pre-processing does not depart from the idea of the present invention.

According to the above-described formula, the larger the value indicating a degree of reliability is, the less contribution from the first region feature to the feature of the recognition target to be determined is, and the more contribution from the foreground region feature is. Conversely, the smaller the value indicating a degree of reliability is, the more contribution from the first region feature to the feature of the recognition target to be determined is, and the less contribution from the foreground region feature is. In other words, a magnitude of contribution from the foreground region feature to the feature of the recognition target to be determined changes according to a degree of reliability. The degree of reliability can also be said to be a value indicating a magnitude of contribution from the foreground region feature to the feature of the recognition target to be determined.

The above-described formula is an example of a formula in a case when a degree of reliability is expressed as a value in a range from 0 to 1. When the reliability degree determination method is different, the above-described formula may also be modified by designing.

Hereinafter, a feature of a recognition target to be determined by the feature determination unit 116 is also referred to as a "determined feature".

===Output Unit 117===

The output unit 117 outputs a feature (determined feature) of a recognition target, which is determined by the feature determination unit 116. An example of an output destination of an output by the output unit 117 includes a display device, a storage device, and a communication network. When the output unit 117 outputs information to the display device, the output unit 117 may convert the information in such a way that the display device can display the information. The above-described display device and storage device may be external devices of the feature extraction device 11, or may be constituent elements included in the feature extraction device 11.

<Operation>

Figure 5:
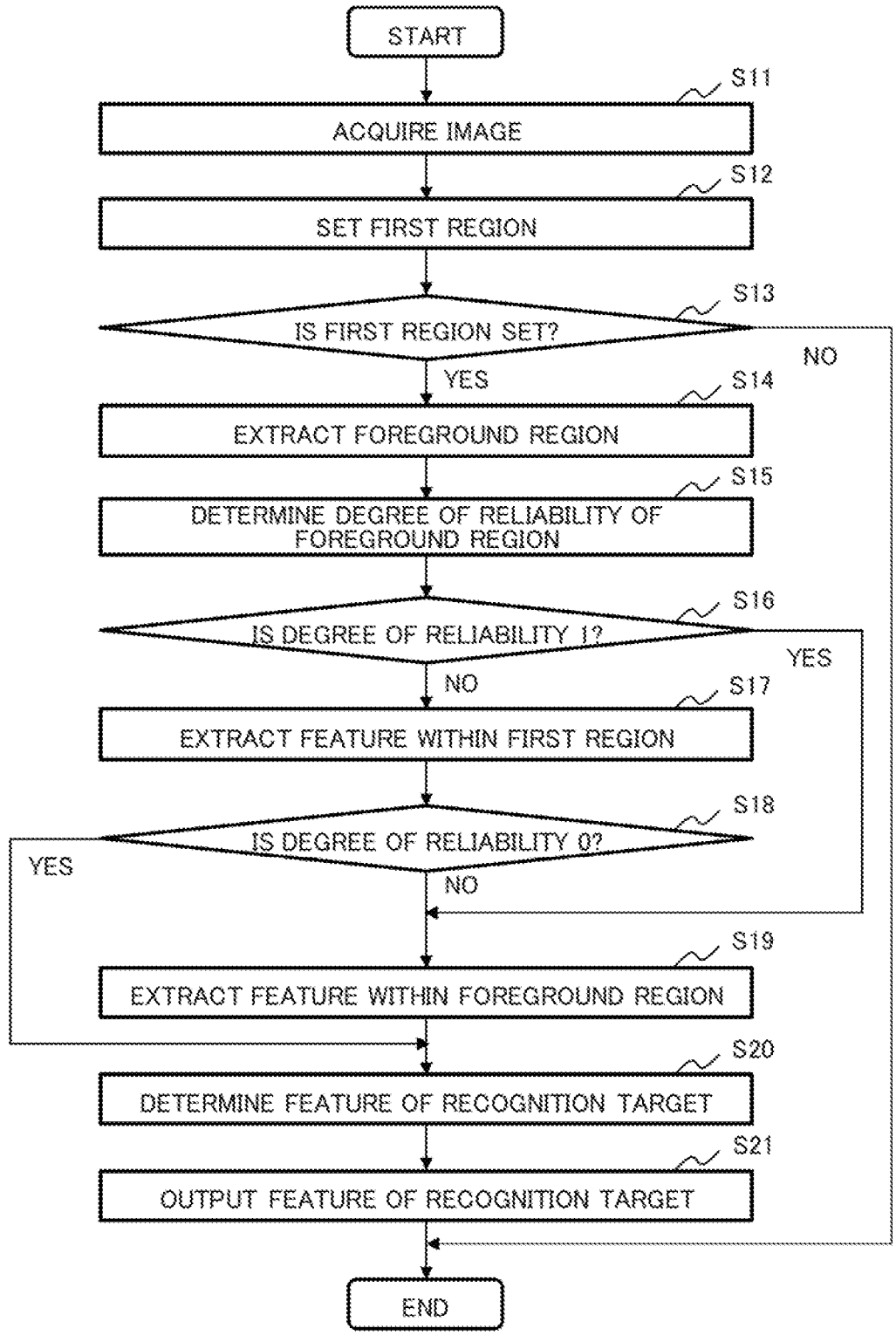
FIG. 5 is a flowchart illustrating a flow of processing by the feature extraction device according to the first example embodiment.

In the following, a flow of processing by the feature extraction unit 11 is described with reference to a flowchart of FIG. 5. When each processing is performed by a device that executes a program, each processing may be performed in accordance with an order of instructions in the program. When each processing is executed by a separate device, a device that has completed the processing may notify a device that executes next processing, and the next processing may be executed thereby. Each unit that performs processing may receive data necessary for each processing from a unit that has generated the data, or read the data from a storage area of the feature extraction device 11.

First, the image acquisition unit 110 acquires images from a capturing device such as a camera, a storage medium, or the like (Step S11).

Next, the first region setting unit 111 sets a first region in at least one image (target image) among the acquired images (Step S12). When the first region is unable to be set (NO in Step S13) because of such a reason that a recognition target is not detected from the target image, the feature extraction device 11 ends the processing.

When the first region is able to be set (YES in Step S13), the foreground region setting unit 112 extracts a foreground region in the target image (Step S14).

Next, the reliability degree determination unit 113 determines a degree of reliability of the foreground region, based on a relationship between the first region and the foreground region (Step S15). When the degree of reliability is determined, the reliability degree determination unit 113, for example, associates information indicating the determined degree of reliability with the foreground region. Specifically, for example, the reliability degree determination unit 113 may generate data in which information for specifying the foreground region and information indicating the degree of reliability are associated with each other. Then, the reliability degree determination unit 113 may record the generated data in a storage area within the feature extraction device 11, or directly transmit the generated data to a constituent element that refers to the degree of reliability.

Processing from Step S16 to Step S19 is processing for extracting a necessary feature. When a value indicating the degree of reliability determined by the reliability degree determination unit 113 is not 1 (NO in Step S16), the first extraction unit 114 extracts a feature within the first region (Step S17). When a value indicating the degree of reliability is 1 (YES in Step S16), the first extraction unit 114 is not required to extract a feature within the first region. When a value indicating the degree of reliability is not 0 (NO in Step S18), the second extraction unit 115 extracts a feature within the foreground region (Step S19). When a value indicating the degree of reliability is 0 (YES in Step S18), the second extraction unit 115 is not required to extract a feature within the foreground region.

As an additional configuration, when a value indicating the degree of reliability is considerably low (e.g., a value indicating the degree of reliability is lower than a predetermined value r), the feature extraction device 11 may perform exception processing. In the exception processing, the feature extraction device 11 may extract neither the first region feature nor the foreground region feature, output an error indicating information that "a significant feature is unable to be extracted", and end the processing.

After the necessary feature is extracted, the feature determination unit 116 determines a feature of the recognition target (Step S20). Then, the output unit 117 outputs the feature of the recognition target (Step S21).

Advantageous Effect

The feature extraction device 11 according to the first example embodiment is able to stably extract a feature of a recognition target, even when a foreground is not correctly extracted. A reason for this is that the reliability degree determination unit 113 determines a degree of reliability of a foreground region, and the feature determination unit 116 determines a feature of a recognition target by applying more weight to a feature from a first region than a feature from the foreground region, as the degree of reliability decreases. In other words, setting a degree of reliability suppresses that a feature to be extracted from a foreground region that is not correctly extracted is greatly reflected in a feature to be determined.

Figure 6:
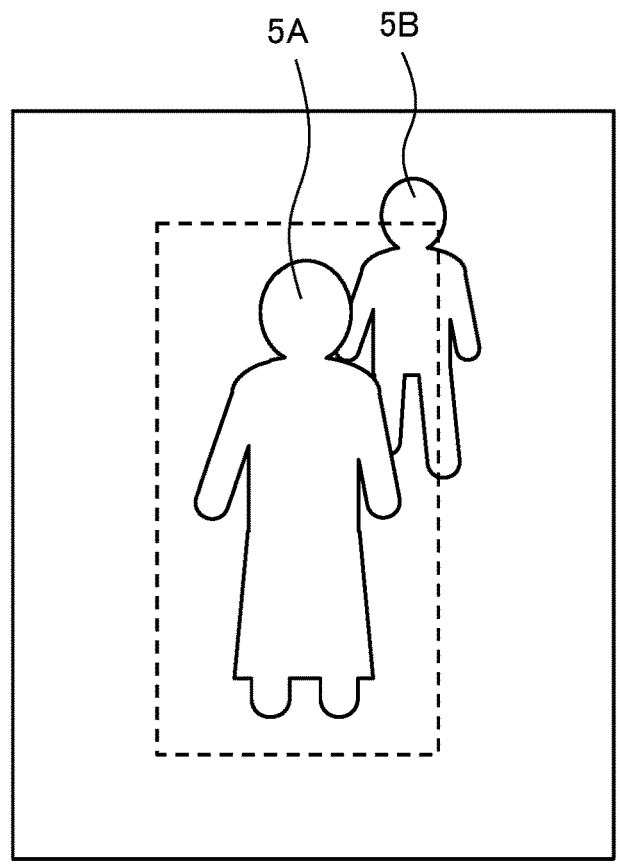
FIG. 6 is a first diagram for describing an advantageous effect by the feature extraction device according to the first example embodiment.
Figure 7:
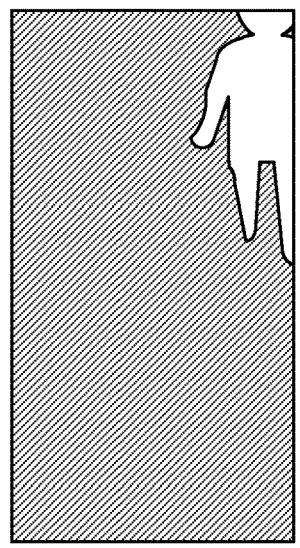
FIG. 7 is a second diagram for describing the advantageous effect by the feature extraction device according to the first example embodiment.

An advantageous effect is described by using a specific example. For example, it is assumed that a target image is an image acquired by capturing a certain person 5A, and another person 5B passing behind the person 5A, as illustrated in FIG. 6. A broken line in FIG. 6 indicates a first region set by the first region setting unit 111. In this image, for example, a foreground region within the first region, which is extracted by the foreground region extraction unit 112, may become a portion illustrated by a white portion in FIG. 7 due to a reason that a color of the person 5A is similar to a color of a background, and the like.

In such a case, a feature of the person 5A is not reflected at all on a feature to be extracted from the extracted foreground region. In this case, a feature to be derived from the entirety of the first region is more useful as a feature in which the feature of the person 5A is reflected. In the present example embodiment, in this case, since the reliability degree determination unit 113 determines a degree of reliability to be a low value, a feature to be derived from the first region is strongly reflected in a determined feature. Therefore, the feature extraction device 11 is able to acquire the feature of the person 5A more accurately.

Modification Example (Example of Reliability Degree Determination Method)

(1)

The reliability degree determination unit 113 may determine a degree of reliability, based on comparison between a shape of a foreground region and a reference shape.

Figure 8:
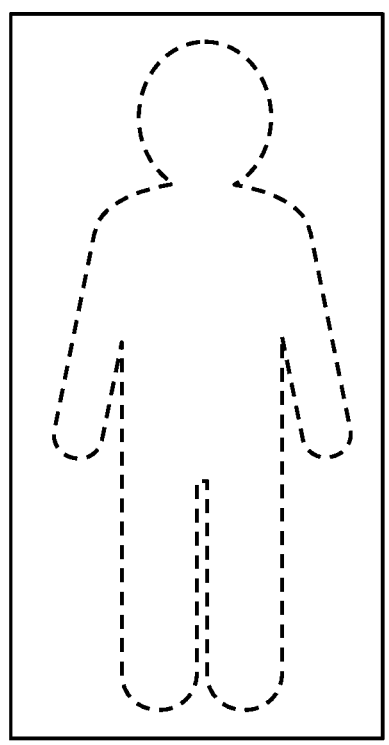
FIG. 8 is a diagram illustrating an example of a model silhouette.

For example, the feature extraction device 11 prepares in advance a silhouette of a recognition target (hereinafter, described as a "model silhouette"), which is a reference. A shape illustrated by the broken line in FIG. 8 is an example of a shape of the model silhouette. The reliability degree determination unit 113 performs comparison between the shape of the model silhouette and the shape of a foreground region. The reliability degree determination unit 113 determines a degree of reliability of the foreground region, based on the comparison. Specifically, the reliability degree determination unit 113 determines a degree of reliability by a determination method in which a degree of reliability is determined to be higher, as similarity of the shape of the foreground region to the shape of the model silhouette increases.

The feature extraction device 11 may prepare a plurality of model silhouettes having different postures. In this case, the reliability degree determination unit 113 may select one model silhouette from among the plurality of model silhouettes, based on at least one of a size and an aspect ratio of a first region extracted by the first region setting unit 111. For example, when a size of the first region is smaller than a standard size, the first region setting unit 111 may select a model silhouette being a model in a bent posture. For example, when a ratio between a vertical length and a horizontal length of the first region is 1:1, the first region setting unit 111 may select a model silhouette in which a ratio of the vertical length to the horizontal length is 1:1. Then, the first region setting unit 111 uses the selected model silhouette for comparison.

A specific example of comparison is described in the following.

For example, the reliability degree determination unit 113 calculates each of an area A1 of a region where a foreground region overlaps a model silhouette, and an area A2 of a region where a first region is included neither in the foreground region nor in the model silhouette. Then, the reliability degree determination unit 113 determines a degree of reliability by a determination method in which a degree of reliability is determined to be higher, as a sum of the areas A1 and A2 increases. As one example, the reliability degree determination unit 113 may calculate a value c indicating a degree of reliability, according to the following formula.

$$c=\min\{1, p \times (A1+A2)/S\}$$

Note that, "p" denotes a coefficient (set value) of 1 or larger, and "S" denotes an area of a first region. For example, when p=1.25, as far as a ratio of a sum of the areas A1 and A2 to an area of the first region is 80% or more, the degree of reliability becomes "1".

The reliability degree determination unit 113 may use an area A3 of a region where a foreground region does not overlap a model silhouette, and an area A4 of a region where a region of the model silhouette does not overlap the foreground region. As one example, the reliability degree determination unit 113 may calculate the value c indicating a degree of reliability according to the following formula.

$$c=\min\{1, \max\{0, p \times A1/(A1+A3+A4)\}\}$$

(2)

The reliability degree determination unit 113 may determine a degree of reliability, based on the number of pieces of a foreground region isolated. When a recognition target is one piece of block, idealistically, a foreground region extracted by the foreground region extraction unit 112 is one continuous region. Therefore, it can be said that a probability that a foreground region is not accurately extracted is higher, as the number of discontinuous pieces of the foreground region increases. Based on this theory, the reliability degree determination unit 113 may be configured in such a way that a degree of reliability is determined to be lower, as the number of pieces (specifically, pieces that are present as individual pieces in a discontinuous manner) of a foreground region isolated increases.

(Example in which Degree of Reliability is not Numerical Value)

A degree of reliability may not be necessarily expressed as a numerical value. For example, a degree of reliability may be expressed in a format of text data such as "high" or "low". In this case, the feature extraction device 11 may store information in which text data indicating a degree of reliability, and a numerical value indicating a weight are associated with each other. In determining a feature of a recognition target, the reliability degree determination unit 113 may perform, with respect to a foreground region feature and a first region feature, an addition accompanying weighting, with use of a numerical value associated with text data indicating a degree of reliability, and derive the feature of the recognition target.

Second Example Embodiment

Figure 9:
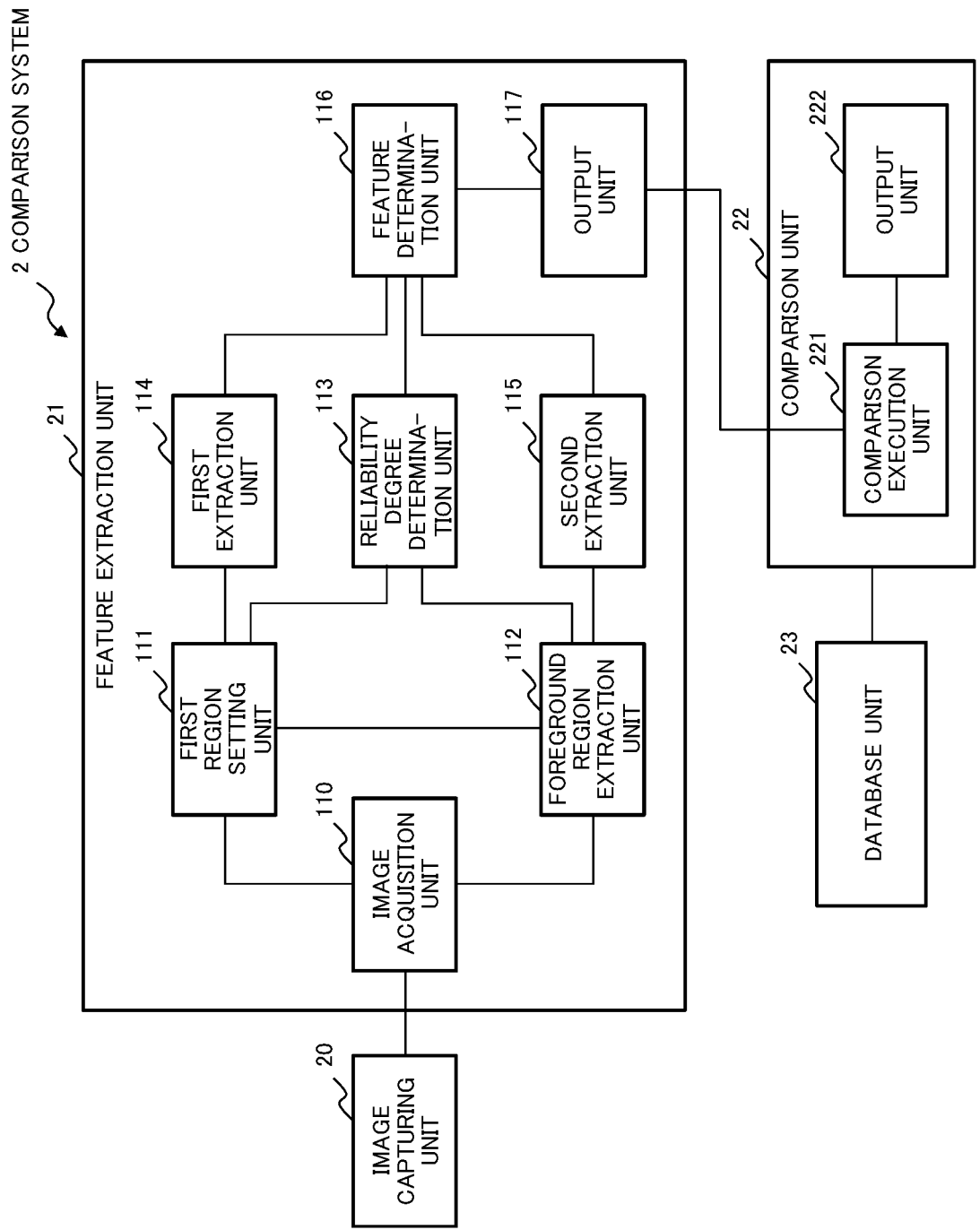
FIG. 9 is a block diagram illustrating a configuration of a comparison system according to a second example embodiment of the present invention.

A second example embodiment according to the present invention is described. FIG. 9 is a block diagram illustrating a configuration of a comparison system 2 according to the second example embodiment. The comparison system 2 includes an image capturing unit 20, a feature extraction unit 21, a comparison unit 22, and a database unit 23.

Each unit included in the comparison system 2 may be implemented by an individual device, or a part or the entirety of the comparison system 2 may be achieved by one device.

Communication of data among units achieved by individual devices is performed by, for example, wired or wireless communication.

The image capturing unit 20 captures a predetermined area, and thereby acquires an image of the predetermined area. The image capturing unit 20 is, for example, a monitoring camera. The image capturing unit 20 transmits the acquired image to an image acquisition unit 110 of the feature extraction unit 21.

The feature extraction unit 21 is a unit having a same configuration as a configuration included in the feature extraction device 11 according to the first example embodiment. Description on each unit included in the feature extraction unit 21 is omitted.

The comparison unit 22 is a unit relating to comparison of a feature (determined feature) of a recognition target, which is determined by a feature determination unit 116 of the feature extraction unit 21. The comparison unit 22 receives a determined feature from an output unit 117 of the feature extraction unit 21.

A comparison execution unit 221 executes comparison of the determined feature with a feature (hereinafter, described as a "reference feature") accumulated in the database unit 23. Specifically, the comparison execution unit 221 determines whether each reference feature matches the determined feature, and specifies a reference feature that is determined to match the determined feature. A matter that two features are "determined to match each other" means that the two features are determined to be features acquired from a same person (or a same object). A comparison method by the comparison execution unit 22 may be a well-known method.

The database unit 23 stores one or more reference features. The database unit 23 stores a reference feature, and information associated with the reference feature. For example, when a recognition target is a person, an example of information associated with a reference feature includes information (a name, an identification number, an age, and the like) of the person from which the reference feature is extracted, a history on a date/time and a place when and where the person is captured, and the like.

When the reference feature that is determined to match the determined feature is specified, the comparison execution unit 221 transmits, to an output unit 222, information associated with the specified reference feature. The comparison execution unit 221 may only transmit information indicating that a reference feature that is determined to match a determined feature is present.

The output unit 222 outputs information indicating a result of comparison.

The information indicating a result of comparison is information indicating information relating to a reference feature that is determined to match a determined feature. Alternatively, the information indicating a result of comparison is, for example, information indicating that a reference feature that is determined to match a determined feature is present in the database unit 23.

By the output unit 222 outputting information indicating a result of comparison, for example, a monitoring person knows that a person stored in the database unit 23 is present within a capturing area of the image capturing unit 20.

Since a feature of a recognition target, which is determined by the feature extraction unit 21 is used, the comparison system 2 according to the second example embodiment is able to more accurately acquire a comparison result.

Figure 10:
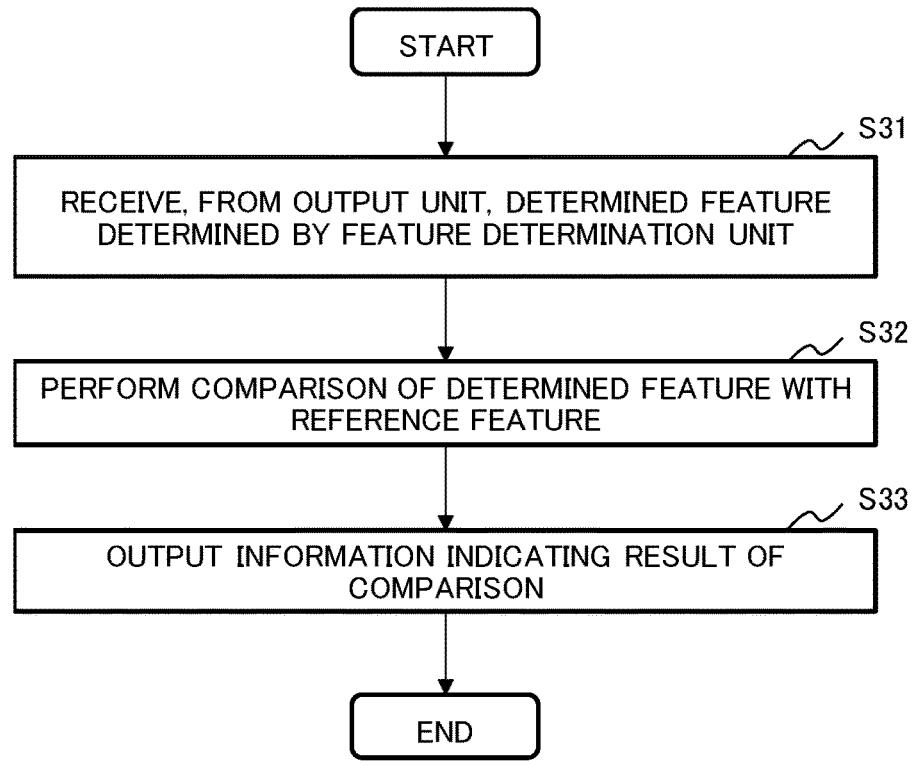
FIG. 10 is a flowchart illustrating a flow of processing by a comparison unit according to the second example embodiment.

A flow of processing relating to comparison by the comparison unit 22 is described with reference to a flowchart of FIG. 10.

First, the comparison unit 22 receives, from the output unit 117, a determined feature determined by the feature determination unit 116 (Step S31). Then, the comparison execution unit 221 performs comparison of the determined feature with a reference feature (Step S32). Then, the output unit 222 outputs information indicating a result of the comparison (Step S33).

Third Example Embodiment

Figure 11:
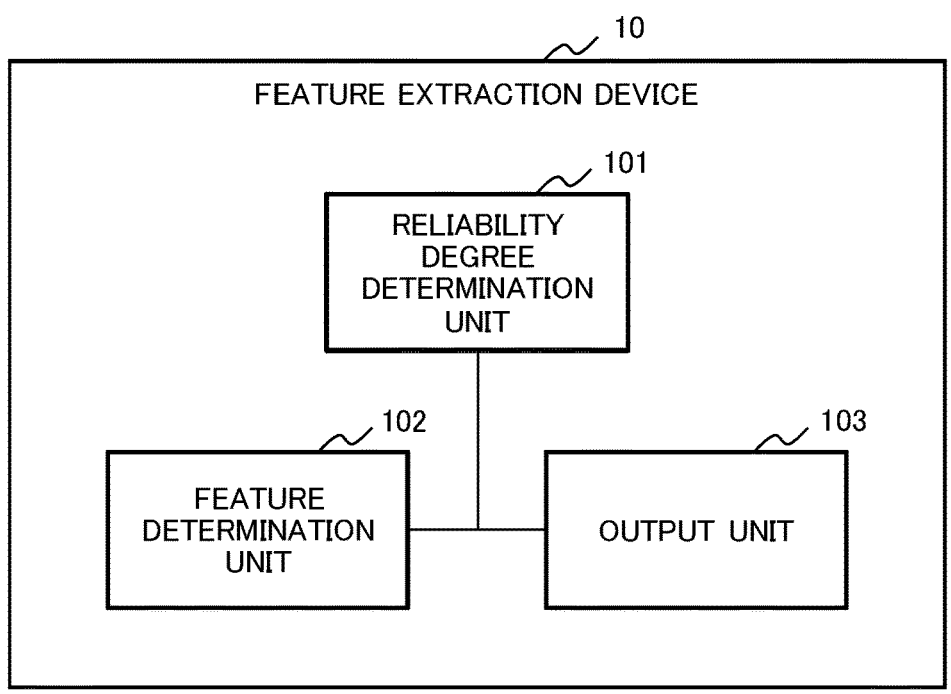
FIG. 11 is a block diagram illustrating a configuration of a feature extraction device according to one example embodiment of the present invention.

A feature extraction device 10 according to one example embodiment of the present invention is described. FIG. 11 is a block diagram illustrating a configuration of the feature extraction device 10. The feature extraction device 10 includes a reliability degree determination unit 101, a feature determination unit 102, and an output unit 103.

The reliability degree determination unit 101 determines a degree of reliability with respect to a second region being a region extracted as a foreground region of an image within a first region extracted, from the image, as a partial region including a recognition target. The degree of reliability is information indicating a likelihood that the second region is the recognition target. The reliability degree determination unit 113 according to the above-described example embodiment is one example of the reliability degree determination unit 101.

The feature determination unit 102 determines a feature of the recognition target, based on the degree of reliability determined by the reliability degree determination unit 101, and by using a first feature being a feature extracted from the first region, and a second feature being a feature extracted from the second region. The feature determination unit 116 according to the above-described example embodiment is one example of the feature determination unit 102.

The output unit 103 outputs information indicating the feature of the recognition target determined by the feature determination unit 102. The output unit 117 according to the above-described example embodiment is one example of the output unit 103.

Figure 12:
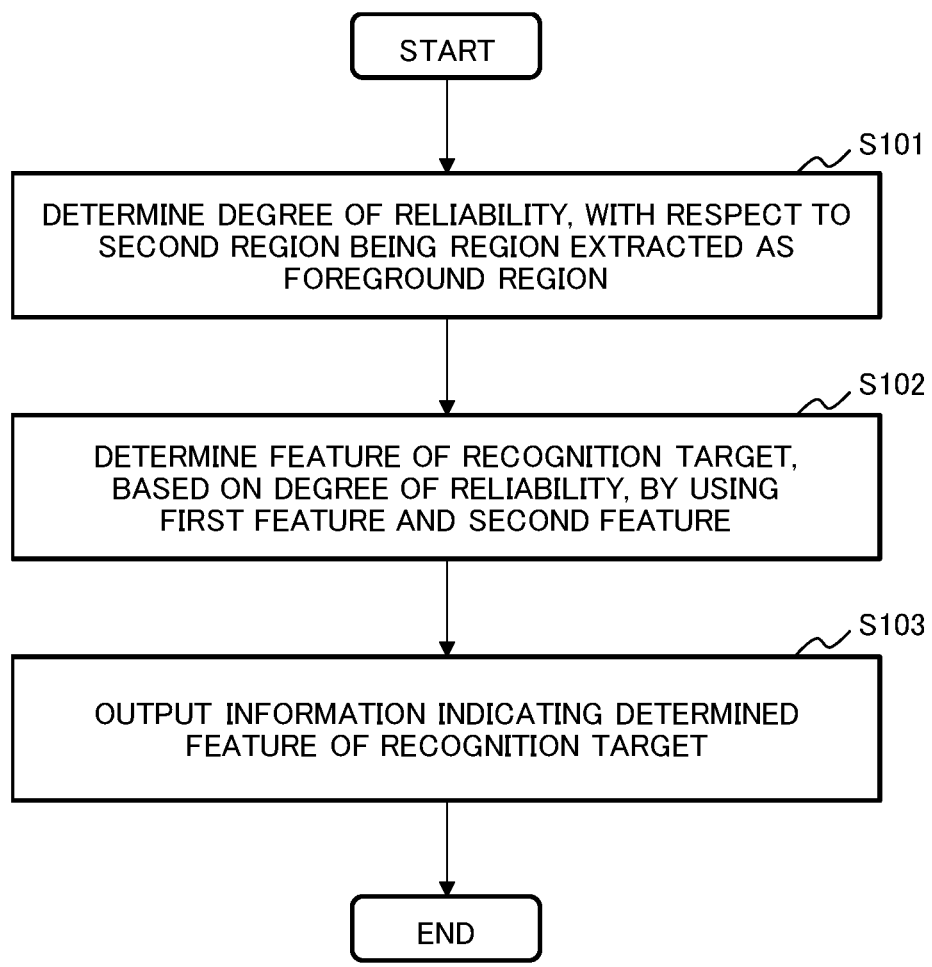
FIG. 12 is a flowchart illustrating a flow of processing by a feature extraction device according to the one example embodiment of the present invention.

A flow of processing by the feature extraction device 10 is described with reference to a flowchart of FIG. 12.

First, the reliability degree determination unit 101 determines a degree of reliability with respect to a second region being a region extracted as a foreground region and within a first region (Step S101).

Next, the feature determination unit 102 determines a feature of a recognition target, based on the degree of reliability, and by using a first feature and a second feature (Step S102).

Then, the output unit 103 outputs information indicating the determined feature of the recognition target (Step S103).

The feature extraction device 10 is able to suppress inaccurate derivation of a feature, even when a foreground region is not correctly extracted. A reason for this is that the reliability degree determination unit 101 determines a degree of reliability with respect to a second region being a region extracted as a foreground region, and determines a feature of a recognition target, based on the degree of reliability, and by using a first feature and a second feature. In particular, when the reliability degree determination unit 101 determines a feature of a recognition target by a feature determination method in which contribution from a first feature increases as a degree of reliability decreases, it is possible to reduce inaccuracy of a feature to be derived when a foreground region is not correctly extracted. A reason for this is as described in the description on the advantageous effect of the first example embodiment.

<Hardware Configuration for Achieving Each Unit of Example Embodiment>

In the example embodiments according to the present invention described above, a block indicating each constituent element of each device is indicated as a functional unit. However, a block indicating a constituent element does not necessarily mean that each constituent element is constituted of an individual module.

Processing of each constituent element may be achieved, for example, by causing a computer system to read and execute a program which is stored in a computer-readable storage medium, and processing of which is executed by the computer system. The "computer-readable storage medium" is, for example, a portable medium such as an optical disc, a magnetic disk, a magneto-optical disk, and a non-volatile semiconductor memory, and a storage device such as a read only memory (ROM) and a hard disk incorporated in a computer system, and the like. The "computer-readable storage medium" also includes a medium capable of temporarily holding a program, as exemplified by a volatile memory within a computer system, and a medium for transmitting a program, as exemplified by a communication line such as a network and a telephone line. The above-described program may also be a program for achieving a part of the above-described function, or a program capable of achieving the above-described function by being combined with a program already stored in a computer system.

Figure 13:
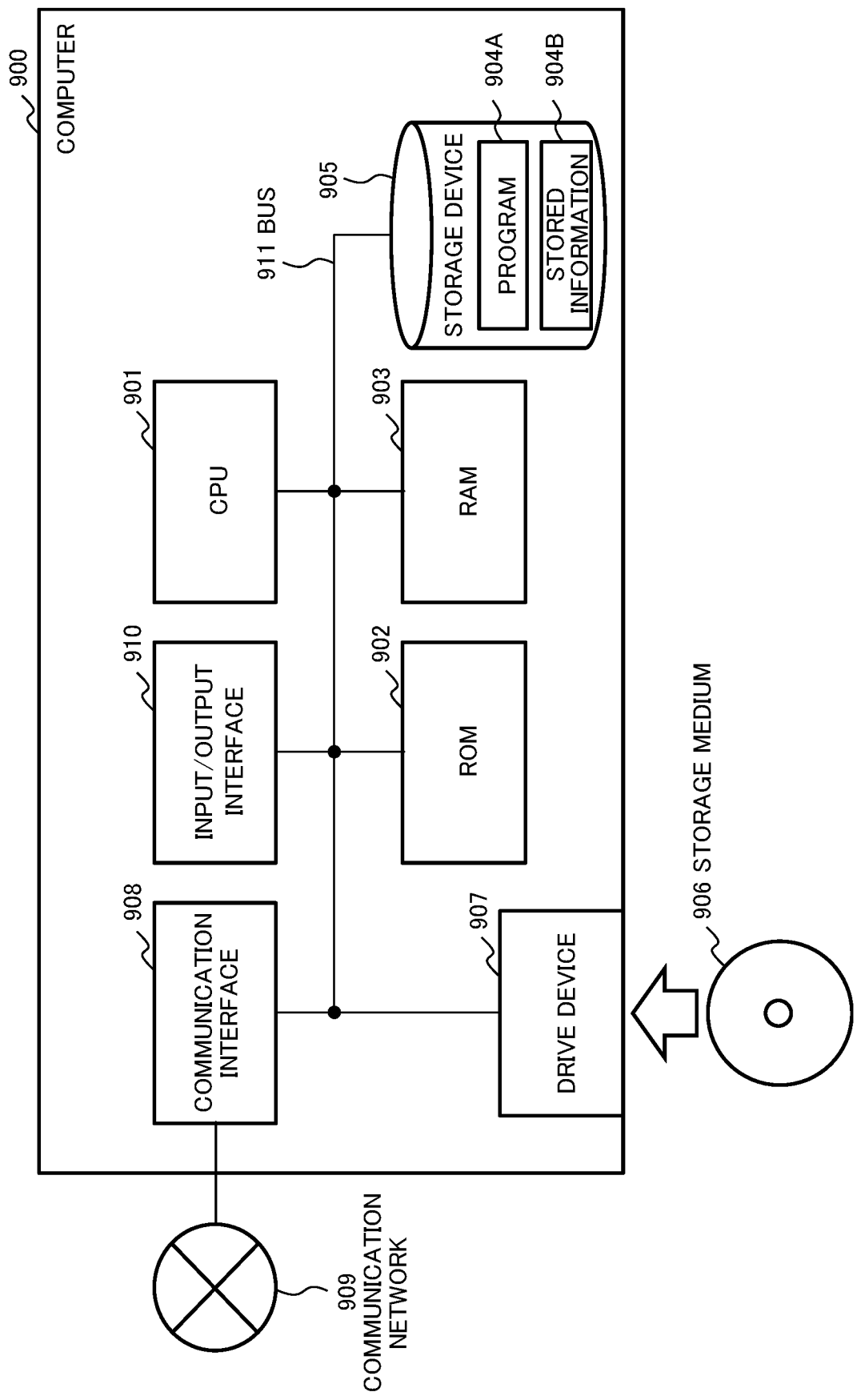
FIG. 13 is a block diagram illustrating an example of hardware constituting each unit of each example embodiment according to the present invention.

As one example, the "computer system" is a system including a computer 900 as illustrated in FIG. 13. The computer 900 includes a configuration as described below.

One or a plurality of central processing units (CPUs) 901

A ROM 902

A random access memory (RAM) 903

A program 904A and stored information 904B to be loaded into the RAM 903

A storage device 905 storing the program 904A and the stored information 904B

A drive device 907 for performing reading and writing with respect to a storage medium 906

A communication interface 908 connected to a communication network 909

An input/output interface 910 for inputting and outputting data

A bus 911 for connecting constituent elements

For example, each of the constituent elements of each of the devices in each of the example embodiments is achieved by the CPU 901 loading the program 904A that achieves a function of the constituent element into the RAM 903 and executing the program 904A. The program 904A that achieves a function of each of the constituent elements of each of the devices is, for example, stored in advance in the storage device 905 or the ROM 902. The CPU 901 reads the program 904A as necessary. The storage device 905 is, for example, a hard disk. The program 904A may be supplied to the CPU 901 via the communication network 909, or may be stored in advance in the storage medium 906, read by the drive device 907, and supplied to the CPU 901. The storage medium 906 is, for example, a portable medium such as an optical disc, a magnetic disk, a magneto-optical disk, and a non-volatile semiconductor memory.

Various modification examples are available as a method for achieving each of the devices. For example, each of the devices may be achieved by any individual combination of the computer 900 and a program, for each of the constituent elements. Alternatively, a plurality of constituent elements included in each of the devices may be achieved by any one combination of the computer 900 and a program.

A part or all of each of the constituent elements of each of the devices may be achieved by another general-purpose or dedicated circuitry, a computer, and the like, or a combination thereof. These may be constituted of a single chip, or may be constituted of a plurality of chips connected via a bus.

When a part or all of each of the constituent elements of each of the devices is achieved by a plurality of computers, circuitries, or the like, the plurality of computers, the circuitry, or the like may be concentratedly disposed or may be distributively disposed. For example, the computers, the circuitries, or the like may be achieved as a form in which each of the computers, the circuitries, and the like is connected via a network, such as a client-and-server system, a cloud computing system, and the like.

A part or all of the above-described example embodiments may be described as the following supplementary notes, but are not limited to the following.

<<Supplementary Notes>>

[Supplementary Note 1]

A feature extraction device including:

a reliability degree determination unit for determining a degree of reliability indicating a likelihood of being a recognition target, with respect to a second region being a region extracted as a foreground region of an image, the second region being a region within a first region, the first region being a region extracted from the image as a partial region including the recognition target;

a feature determination unit for determining a feature of the recognition target, based on the degree of reliability, by using a first feature being a feature extracted from the first region, and a second feature being a feature extracted from the second region; and an output unit for outputting information indicating the feature of the recognition target determined.

[Supplementary Note 2]

The feature extraction device according to supplementary note 1, wherein the feature determination unit determines the feature of the recognition target by a feature determination method in which the second feature is greatly reflected as the degree of reliability increases, and the first feature is greatly reflected as the degree of reliability decreases.

[Supplementary Note 3]

The feature extraction device according to supplementary note 2, wherein the feature determination unit performs, with respect to the first feature and the second feature, an addition accompanying weighting based on the degree of reliability, and determines a result of the addition as the feature of the recognition target.

[Supplementary Note 4]

The feature extraction device according to any one of supplementary notes 1 to 3, wherein the reliability degree determination unit calculates a ratio of an area of the second region to an area of the first region, and determines the degree of reliability, based on a reliability degree determination method in which the degree of reliability is determined to be lower as the ratio becomes larger than a first predetermined value, and the degree of reliability is determined to be lower as the ratio becomes smaller than a second predetermined value.

[Supplementary Note 5]

The feature extraction device according to any one of supplementary notes 1 to 3, wherein the reliability degree determination unit determines the degree of reliability based on comparison between the second region and a model having a shape of the recognition target.

[Supplementary Note 6]

The feature extraction device according to supplementary note 5, wherein the reliability degree determination unit selects the model for use in comparison from among a plurality of the models based on at least one of a size and an aspect ratio of the first region.

[Supplementary Note 7]

The feature extraction device according to any one of supplementary notes 1 to 3, wherein the reliability degree determination unit determines the degree of reliability based on a number of pieces of the second region isolated.

[Supplementary Note 8]

A comparison system including:

the feature extraction device according to any one of supplementary notes 1 to 7;

a comparison execution unit for performing comparison of the feature of the recognition target output by the output unit with a feature stored in a database; and a second output unit for outputting information indicating a result of the comparison.

[Supplementary Note 9]

A feature extraction method including:

determining a degree of reliability indicating a likelihood of being a recognition target, with respect to a second region being a region extracted as a foreground region of an image, the second region being a region within a first region extracted from the image as a partial region including the recognition target;

determining a feature of the recognition target, based on the degree of reliability, by using a first feature being a feature extracted from the first region, and a second feature being a feature extracted from the second region; and outputting information indicating the feature of the recognition target determined.

[Supplementary Note 10]

The feature extraction method according to supplementary note 9, further including determining the feature of the recognition target by a feature determination method in which the second feature is greatly reflected as the degree of reliability increases, and the first feature is greatly reflected as the degree of reliability decreases.

[Supplementary Note 11]

The feature extraction method according to supplementary note 10, further including performing, with respect to the first feature and the second feature, an addition accompanying weighting based on the degree of reliability, and determining a result of the addition as the feature of the recognition target.

[Supplementary Note 12]

The feature extraction method according to any one of supplementary notes 9 to 11, further including:

calculating a ratio of an area of the second region to an area of the first region; and determining the degree of reliability, based on a reliability degree determination method in which the degree of reliability is determined to be lower as the ratio becomes larger than a first predetermined value, and the degree of reliability is determined to be lower as the ratio becomes smaller than a second predetermined value.

[Supplementary Note 13]

The feature extraction method according to any one of supplementary notes 9 to 11, further including determining the degree of reliability based on comparison between the second region and a model having a shape of the recognition target.

[Supplementary Note 14]

The feature extraction method according to supplementary note 13, further including selecting the model for use in comparison from among a plurality of the models based on at least one of a size and an aspect ratio of the first region.

[Supplementary Note 15]

The feature extraction method according to any one of supplementary notes 9 to 11, further including determining the degree of reliability based on a number of pieces of the second region isolated.

[Supplementary Note 16]

The feature extraction method according to any one of supplementary notes 9 to 15, further including:

performing comparison of an output feature of the recognition target with a feature stored in a database; and outputting information indicating a result of the comparison.

[Supplementary Note 17]

A computer-readable storage medium storing a program causing a computer to execute:

reliability degree determination processing of determining a degree of reliability indicating a likelihood of being a recognition target, with respect to a second region being a region extracted as a foreground region of an image, the second region being a region within a first region extracted from the image as a partial region including the recognition target;

feature determination processing of determining a feature of the recognition target, based on the degree of reliability, by using a first feature being a feature extracted from the first region, and a second feature being a feature extracted from the second region; and output processing of outputting information indicating the feature of the recognition target determined.

[Supplementary Note 18]

The storage medium according to supplementary note 17, wherein the feature determination processing includes determining the feature of the recognition target by a feature determination method in which the second feature is greatly reflected as the degree of reliability increases, and the first feature is greatly reflected as the degree of reliability decreases.

[Supplementary Note 19]

The storage medium according to supplementary note 18, wherein the feature determination processing includes performing, with respect to the first feature and the second feature, an addition accompanying weighting based on the degree of reliability, and determining a result of the addition as the feature of the recognition target.

[Supplementary Note 20]

The storage medium according to any one of supplementary notes 17 to 19, wherein the reliability degree determination processing includes calculating a ratio of an area of the second region to an area of the first region, and determining the degree of reliability, based on a reliability degree determination method in which the degree of reliability is determined to be lower as the ratio becomes larger than a first predetermined value, and the degree of reliability is determined to be lower as the ratio becomes smaller than a second predetermined value.

[Supplementary Note 21]

The storage medium according to any one of supplementary notes 17 to 19, wherein the reliability degree determination processing includes determining the degree of reliability based on comparison between the second region and a model having a shape of the recognition target.

[Supplementary Note 22]

The storage medium according to supplementary note 21, wherein the reliability degree determination processing includes selecting the model for use in comparison from among a plurality of the models based on at least one of a size and an aspect ratio of the first region.

[Supplementary Note 23]

The storage medium according to any one of supplementary notes 17 to 19, wherein the reliability degree determination processing includes determining the degree of reliability based on a number of pieces of the second region isolated.

[Supplementary Note 24]

The storage medium according to any one of supplementary notes 17 to 23, wherein the program further causes a computer to execute:

comparison execution processing of performing comparison of a determined feature of the recognition target with a feature stored in a database; and second output processing of outputting information indicating a result of the comparison.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

REFERENCE SIGNS LIST 10, 11, 12 Feature extraction device
111 First region setting unit
112 Foreground region extraction unit
113, 101 Reliability degree determination unit
114 First extraction unit
115 Second extraction unit
116, 102 Feature determination unit
117, 103 Output unit
2 Comparison system
20 Image capturing unit
21 Feature extraction unit
22 Comparison unit
221 Comparison execution unit
222 Output unit
23 Database unit
5A First person
5B Second person
900 Computer
901 CPU
902 ROM
903 RAM
904A Program
904B Stored information
905 Storage device
906 Storage medium
907 Drive device
908 Communication interface
909 Communication network
910 Input/output interface
911 Bus

The invention claimed is:

1. A comparison system comprising:
a memory; and
at least one processor coupled to the memory,
the at least one processor performing operations to:
determine a degree of reliability indicating a likelihood of being a recognition target, with respect to a second region extracted as a foreground region of an image, the second region within a first region, the first region extracted from the image as a partial region including the recognition target;
determine a feature of the recognition target, based on the degree of reliability, by using a first feature extracted from the first region and a second feature extracted from the second region; and
output information indicating the feature of the recognition target,
wherein the at least one processor further performs the operation to:
calculate a ratio of an area of the second region to an area of the first region, and
determine the degree of reliability, based on a reliability degree determination method in which the degree of reliability is determined to be lower as the ratio becomes larger when the ratio is larger than a first predetermined value, and the degree of reliability is determined to be lower as the ratio becomes smaller when the ratio is smaller than a second predetermined value.

2. The comparison system according to claim 1, wherein the at least one processor further performs the operation to:
determine the feature of the recognition target by a feature determination method in which the second feature is reflected more than the first feature as the degree of reliability increases, and the first feature is reflected more than the second feature as the degree of reliability decreases.

3. The comparison system according to claim 2, wherein the at least one processor further performs the operation to:
perform, with respect to the first feature and the second feature, an addition accompanying weighting based on the degree of reliability, and determine a result of the addition accompanying weight as the feature of the recognition target.

4. The comparison system according to claim 1, wherein the at least one processor further performs the operation to:
determine the degree of reliability based further on a comparison between the second region and a model having a shape of the recognition target.

5. The comparison system according to claim 4, wherein the at least one processor further performs the operation to:
select the model for use in the comparison from among a plurality of models based on at least one of a size and an aspect ratio of the first region.

6. The comparison system according to claim 1, wherein the at least one processor further performs the operation to:
determine the degree of reliability based further on a number of isolated pieces of the second region.

7. The comparison system according to claim 1, wherein the at least one processor further performs the operation to:
perform a comparison of the feature of the recognition target with a feature stored in a database; and
output information indicating a result of the comparison.

8. The comparison system according to claim 1, the at least one processor further performs operation to
determine the degree of reliability, based on the reliability degree determination method in which the degree of reliability is determined to be a maximum when the ratio is smaller than the first predetermined value and is larger than the second predetermined value.

9. A feature extraction method comprising:
by at least one processor
determining a degree of reliability indicating a likelihood of being a recognition target, with respect to a second region extracted as a foreground region of an image, the second region within a first region extracted from the image as a partial region including the recognition target;
determining a feature of the recognition target, based on the degree of reliability, by using a first feature extracted from the first region, and a second feature extracted from the second region; and
outputting information indicating the feature of the recognition target,
wherein the method further comprises, by the at least one processor:
calculating a ratio of an area of the second region to an area of the first region, and
determining the degree of reliability, based on a reliability degree determination method in which the degree of reliability is determined to be lower as the ratio becomes larger when the ratio is larger than a first predetermined value, and the degree of reliability is determined to be lower as the ratio becomes smaller when the ratio is smaller than a second predetermined value.

10. The feature extraction method according to claim 9, further comprising
determining the feature of the recognition target by a feature determination method in which the second feature is reflected more than the first feature as the degree of reliability increases, and the first feature is reflected more than the second feature as the degree of reliability decreases.

11. The feature extraction method according to claim 10, further comprising
performing, with respect to the first feature and the second feature, an addition accompanying weighting based on the degree of reliability, and determining a result of the addition accompanying weighting as the feature of the recognition target.

12. The feature extraction method according to claim 9, further comprising
determining the degree of reliability based further on a comparison between the second region and a model having a shape of the recognition target.

13. The feature extraction method according to claim 12, further comprising
selecting the model for use in the comparison from among a plurality of models based on at least one of a size and an aspect ratio of the first region.

14. The feature extraction method according to claim 9, further comprising
determining the degree of reliability, based on the reliability degree determination method in which the degree of reliability is determined to be a maximum when the ratio is smaller than the first predetermined value and is larger than the second predetermined value.

15. A non-transitory computer-readable storage medium storing a program causing a computer to execute:
determining a degree of reliability indicating a likelihood of being a recognition target, with respect to a second region extracted as a foreground region of an image, the second region within a first region extracted from the image as a partial region including the recognition target;
determining a feature of the recognition target, based on the degree of reliability, by using a first feature extracted from the first region, and a second feature extracted from the second region; and
outputting information indicating the feature of the recognition target,
wherein the program causes the computer to further execute:
calculate a ratio of an area of the second region to an area of the first region, and
determine the degree of reliability, based on a reliability degree determination method in which the degree of reliability is determined to be lower as the ratio becomes larger when the ratio is larger than a first predetermined value, and the degree of reliability is determined to be lower as the ratio becomes smaller when the ratio is smaller than a second predetermined value.

16. The non-transitory computer-readable storage medium according to claim 15, wherein
the program causes the computer to further execute:
determining the feature of the recognition target by a feature determination method in which the second feature is reflected more than the first feature as the degree of reliability increases, and the first feature is reflected more than the second feature as the degree of reliability decreases.

17. The non-transitory computer-readable storage medium according to claim 16, wherein
the program causes the computer to further execute:
performing, with respect to the first feature and the second feature, an addition accompanying weighting based on the degree of reliability, and determining a result of the addition accompanying weighting as the feature of the recognition target.

18. The non-transitory computer-readable storage medium according to claim 15, wherein
the program causes the computer to further execute:
determining the degree of reliability based further on a comparison between the second region and a model having a shape of the recognition target.

19. The non-transitory computer-readable storage medium according to claim 18, wherein
the program causes the computer to further execute:
selecting the model for use in the comparison from among a plurality of models based on at least one of a size and an aspect ratio of the first region.

20. The non-transitory computer-readable storage medium according to claim 15, wherein
the program causes the computer to further execute:
determining the degree of reliability, based on the reliability degree determination method in which the degree of reliability is determined to be a maximum when the ratio is smaller than the first predetermined value and is larger than the second predetermined value.

* * * * *